Figures 1, 2, 3:
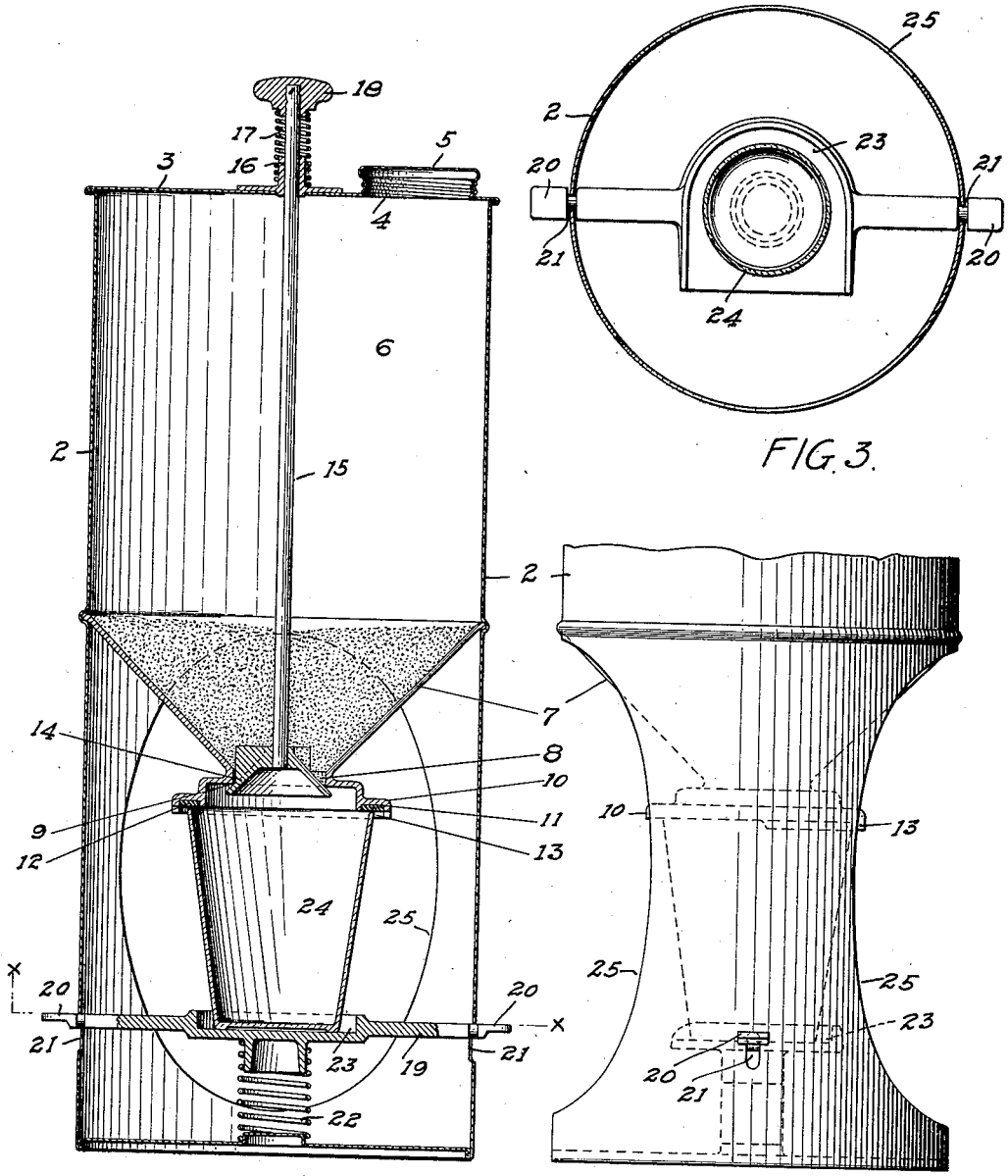

C. BLOMSTROM.
COFFEE CANISTER.
APPLICATION FILED NOV. 30, 1912.

1,087,431.

Patented Feb. 17, 1914.

WITNESSES

INVENTOR
CHARLES BLOMSTROM
BY
ATTORNEYS

UNITED STATES PATENT OFFICE.

CHARLES BLOMSTROM, OF MINNEAPOLIS, MINNESOTA.

COFFEE-CANISTER.

1,087,431. Specification of Letters Patent. Patented Feb. 17, 1914.

Application filed November 30, 1912. Serial No. 734,366.

*To all whom it may concern:*

Be it known that I, CHARLES BLOMSTROM, a citizen of the United States, residing at Minneapolis, in the county of Hennepin, State of Minnesota, have invented certain new and useful Improvements in Coffee-Canisters, of which the following is a specification.

The object of my invention is to provide a receptacle in which articles, such as coffee, may be kept and excluded from the air and drawn from the receptacle at any time without allowing contact of the contents of the receptacle with the outside air during the drawing operation.

A further object is to provide a sealed receptacle which may be used for various other articles which it is desired to exclude from exposure to the air and from germ laden dust and insects.

Other objects of the invention will appear from the following detailed description.

The invention consists generally in various constructions and combinations, all as hereinafter described and particularly pointed out in the claims.

In the accompanying drawings forming part of this specification, Figure 1 is a vertical sectional view through a canister or receptacle embodying my invention, Fig. 2 is a view looking at the side of the receptacle, showing the openings for the insertion and removal of the receiving cup, Fig. 3 is a sectional view on the line $x$—$x$ of Fig. 1.

In the drawing, 2 represents a canister or receptacle, preferably of sheet metal, having a closed top 3 provided with a filling opening 4 normally closed by a cap 5, and a chamber 6 below the top 3 having a hopper bottom 7. This hopper bottom has a discharge opening 8 provided with a valve seat 9. The lower walls of the hopper around the discharge opening are provided with an outwardly extending flange 10 having a seat 11 therein for a gasket 12, preferably of rubber or any other suitable material. A lip 13 depends below the gasket on one side. Within the discharge opening of the chamber 6 I provide a cone-shaped valve 14 having a vertical movement and adapted to close the discharge opening and provided with a stem 15 that is slidable in a guide 16 on the cover 3 and is held in its raised position by a compression spring 17 interposed between the guide 16 and the finger grip 18. The tension of this spring is sufficient to hold the valve in its closed position normally and prevent the escape of the material in the chamber.

In the lower part of the casing 2 I provide a spider 19 having T-shaped ends 20 which are adapted to slip into vertically arranged slots 21 provided in the wall of the casing. A spring 22 normally holds the spider in its raised position, the walls of the slots operating as guides for the ends of the spider, and the T-heads holding the spider in place in the receptacle. The arms of the spider are capable of rotating in the slots 21 to allow the insertion of the T-shaped heads into the slots. The middle portion of the spider is provided with a seat 23 upon which a cup 24 or other receiving device may be placed, having upper edges adapted to contact with the gasket 12 and form a close, air-tight joint therewith, the cup being yieldingly held in engagement with the gasket by the pressure of the spring 22. The casing has openings 25 in its walls through which the receiving cup may be inserted, and the lip 13 operates as a guide to prevent the cup from being pushed in too far beneath the discharge opening of the chamber 6 above. When the cup has been properly positioned beneath the discharge opening of the chamber the valve may be opened and the contents of the chamber will flow down through the opening into the cup. The operator can watch the feed into the cup and regulate the delivery by means of the valve. During the delivery the air will be entirely excluded from the contents of the chamber 6 and coffee and like material will lose none of its strength and aroma during the operation of filling the cup. In other words, the hermetically sealed chamber 6 will remain sealed, not only while the valve is closed but while it is open and discharging the contents of the chamber.

The invention may be utilized for delivering other material than coffee which it would be undesirable to expose to the air, not only because of the loss of strength of the material, due to exposure to the atmosphere, but also because of the fact that the dust laden air might impregnate the material in the chamber with disease germs.

The device is shown used in connection with an article in pulverized or dry form, but it may also be used for liquid of various kinds if preferred.

I claim as my invention:—

1. A canister comprising a casing having a closed chamber therein provided with a hopper bottom and a discharge opening, a valve normally closing said opening, a seat encircling said opening, a spider vertically movable beneath said seat and having a surface adapted to receive a cup placed thereon, the upper edge of said cup contacting with said seat and forming a close joint therewith and preventing exposure to the atmosphere of the material in said chamber when said valve is opened, a spring normally holding said spider in its raised position, and suitable guides for said spider.

2. A canister comprising a casing having a closed chamber formed therein provided with a hopper bottom and a discharge opening, a valve normally closing said opening, a seat encircling said opening, a spider disposed beneath said seat and adapted to receive a cup, the upper edge of the cup contacting with said seat to form a close joint therewith, the walls of said casing having vertical slots therein to receive T-shaped ends provided on said spider and in which slots said ends are vertically slidable, and a spring normally holding said spider in its raised position.

3. A casing comprising a chamber having a closed top and a hopper bottom provided with a discharge opening, a valve normally closing said discharge opening, the bottom of said chamber having a depending flange provided with a seat having a suitable gasket, a receptacle support arranged beneath said discharge opening and adapted to hold a receptacle thereon in contact with the gasket of said seat, and form a close, air-tight joint therewith, whereby when said valve is opened the material in said chamber may flow into said receptacle without exposure to the air.

4. A canister comprising a casing having a closed chamber provided with a hopper bottom and a discharge opening and a valve therefor, a space being provided within said casing beneath said hopper bottom and the wall of said casing having an opening therein leading to said space, a flange encircling said hopper discharge opening and provided with a seat and gasket thereon, a cup support vertically movable beneath said discharge opening, a spring for normally holding said cup support in its raised position, said cup support having a central flattened portion beneath said seat and adapted to support a cup and hold it in contact with said gasket, and said flange and cup support having oppositely arranged stops to limit the horizontal movement of said cup when inserted between said flange and spider.

In witness whereof, I have hereunto set my hand this 22d day of November 1912.

CHARLES BLOMSTROM.

Witnesses:
GENEVIEVE E. SORENSEN,
EDWARD A. PAUL.